(12) United States Patent
Miyasako

(10) Patent No.: US 9,749,539 B2
(45) Date of Patent: Aug. 29, 2017

(54) IMAGE PROCESSING APPARATUS FOR CORRECTING A DISTORTION OF A STILL IMAGE GENERATED FROM A FRAME IMAGE OF A MOVING IMAGE, IMAGE CAPTURING APPARATUS, IMAGE GENERATION APPARATUS, AND IMAGE PROCESSING METHOD

(71) Applicant: CANON KABUSHIKI KAISHA, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/846,392

(22) Filed: Sep. 4, 2015

(65) Prior Publication Data

US 2016/0072999 A1    Mar. 10, 2016

(30) Foreign Application Priority Data

Sep. 9, 2014   (JP) .................... 2014-183494

(51) Int. Cl.
| | |
|---|---|
| H04N 5/228 | (2006.01) |
| H04N 5/232 | (2006.01) |
| H04N 5/77 | (2006.01) |
| H04N 9/804 | (2006.01) |
| H04N 9/82 | (2006.01) |

(52) U.S. Cl.
CPC ....... *H04N 5/2329* (2013.01); *H04N 5/23267* (2013.01); *H04N 5/772* (2013.01); *H04N 9/8042* (2013.01); *H04N 9/8205* (2013.01)

(58) Field of Classification Search
CPC .................. H04N 5/2329; H04N 5/23267
USPC ....................................... 348/208.12
See application file for complete search history.

(56) References Cited

U.S. PATENT DOCUMENTS

| | | | |
|---|---|---|---|
| 2009/0201361 A1* | 8/2009 | Lyon .............. | H04N 5/23203 348/36 |
| 2014/0218569 A1* | 8/2014 | Tsubaki .......... | H04N 5/2329 348/241 |
| 2014/0232887 A1* | 8/2014 | Berberian ...... | H04N 5/23248 348/208.6 |
| 2015/0108329 A1* | 4/2015 | Ohki .............. | H04N 5/23254 250/208.1 |

FOREIGN PATENT DOCUMENTS

JP    2011-114649 A    6/2011

\* cited by examiner

*Primary Examiner* — Usman Khan
(74) *Attorney, Agent, or Firm* — Cowan, Liebowitz & Latman, P.C.

(57) ABSTRACT

An image processing apparatus that records a moving image used for generating a still image by a generation unit, comprises: a correction amount calculation unit configured to calculate, for each frame of the moving image, a correction amount for correction of a rolling shutter distortion of an image signal based on a shake amount detected by a camera shake amount detection unit; and a recording unit configured to record the correction amount in association with an image for each frame of the moving image, wherein the generation unit corrects an image of a selected frame from among the images of the frames based on the associated correction amount, and generates a still image.

13 Claims, 11 Drawing Sheets

IMAGE PROCESSING APPARATUS FOR CORRECTING A DISTORTION OF A STILL IMAGE GENERATED FROM A FRAME IMAGE OF A MOVING IMAGE, IMAGE CAPTURING APPARATUS, IMAGE GENERATION APPARATUS, AND IMAGE PROCESSING METHOD

BACKGROUND OF THE INVENTION

Field of the Invention

The present invention relates to an image processing apparatus, an image capturing apparatus, an image generation apparatus, and an image processing method, and relates particularly to a technique for correcting a distortion of a captured image that is caused by a shake of an image capturing apparatus.

Description of the Related Art

In recent years, CMOS image sensors that serve as an image sensor for use in an image capturing apparatus have become rapidly widespread. When an CMOS image sensor is used to shoot a moving image, a readout method in which accumulated electric charges are sequentially read out one line after another from the upper section to the lower section of the CMOS image sensor is widely used. This readout method is referred to as a rolling shutter method, and has a feature that readout timings are different between the upper and lower sections of the image sensor. Due to this feature, when the image capturing apparatus is shaken and the position of a subject on the image sensing surface is moved, a distortion (rolling shutter distortion) resulting from a difference in charge readout timing of the image sensor occurs in a captured image.

Various types of methods for correcting such a rolling shutter distortion by image processing have been proposed. Japanese Patent Laid-Open No. 2011-114649 discloses a technique for correcting, when a rolling shutter distortion correction amount exceeds a correction limit, only a part of the occurring rolling shutter distortion.

However, when performing control for correcting only a part of a rolling shutter distortion as described in Japanese Patent Laid-Open No. 2011-114649, the following problems will occur. That is, a rolling shutter distortion exceeds a correction limit mainly when the image capturing apparatus is in a panning state. In panning a moving image, even when only a part of a rolling shutter distortion is corrected, the residual uncorrected rolling shutter distortion is hardly noticeable under the movement of the video picture in the panning.

Meanwhile, currently, most image capturing apparatuses capable of shooting a moving image have a function to generate a still image from each of frame images constituting the moving image. When this function is used to generate a still image, the residual uncorrected rolling shutter distortion will significantly reduce the quality of the still image.

SUMMARY OF THE INVENTION

The present invention has been made in consideration of the above situation, and prevents a reduction in the quality of a still image generated from a frame image of a moving image shot by an image capturing apparatus, even when a rolling shutter distortion partially remains uncorrected.

According to the present invention, provided is an image processing apparatus that records a moving image used for generating a still image by a generation unit, comprising: a correction amount calculation unit configured to calculate, for each frame of the moving image, a correction amount for correction of a rolling shutter distortion of an image signal based on a shake amount detected by a camera shake amount detection unit; and a recording unit configured to record the correction amount in association with an image for each frame of the moving image, wherein the generation unit corrects an image of a selected frame from among the images of the frames based on the associated correction amount, and generates a still image.

Further, according to the present invention, provided is an image processing apparatus that records a moving image used for generating a still image by a generation unit, comprising: a correction amount calculation unit configured to calculate, for each frame of the moving image, a correction amount for correction of a rolling shutter distortion of an image signal based on a shake amount detected by a camera shake amount detection unit; a correction unit configured to correct, for each frame, the rolling shutter distortion based on the correction amount; a residual correction amount calculation unit configured to calculate, for each frame, a residual correction amount, which is an amount of the rolling shutter distortion that is not corrected by the correction unit; and a recording unit configured to record the residual correction amount in association with an image for each frame of the moving image, wherein the generation unit corrects an image of a selected frame from among the images of the frames based on the associated residual correction amount, and generates a still image.

Furthermore, according to the present invention, provided is an image capturing apparatus comprising: an image sensor; and an image processing apparatus that records a moving image used for generating a still image by a generation unit, and comprises: a correction amount calculation unit configured to calculate, for each frame of the moving image, a correction amount for correction of a rolling shutter distortion of an image signal based on a shake amount detected by a camera shake amount detection unit; and a recording unit configured to record the correction amount in association with an image for each frame of the moving image, wherein the generation unit corrects an image of a selected frame from among the images of the frames based on the associated correction amount, and generates a still image.

Further, according to the present invention, provided is an image capturing apparatus comprising: an image sensor; and an image processing apparatus that records a moving image used for generating a still image by a generation unit and comprises: a correction amount calculation unit configured to calculate, for each frame of the moving image, a correction amount for correction of a rolling shutter distortion of an image signal based on a shake amount detected by a camera shake amount detection unit; a correction unit configured to correct, for each frame, the rolling shutter distortion based on the correction amount; a residual correction amount calculation unit configured to calculate, for each frame, a residual correction amount, which is an amount of the rolling shutter distortion that is not corrected by the correction unit; and a recording unit configured to record the residual correction amount in association with an image for each frame of the moving image, wherein the generation unit corrects an image of a selected frame from among the images of the frames based on the associated residual correction amount, and generates a still image.

Further, according to the present invention, provided is an image generation apparatus that generates a still image from each frame image of a moving image recorded by an image processing apparatus that records a moving image used for generating a still image by a generation unit, and comprises: a correction amount calculation unit configured to calculate, for each frame of the moving image, a correction amount for correction of a rolling shutter distortion of an image signal based on a shake amount detected by a camera shake amount detection unit; and a recording unit configured to record the correction amount in association with an image for each frame of the moving image, wherein the generation unit corrects an image of a selected frame from among the images of the frames based on the associated correction amount, and generates a still image.

Further, according to the present invention, provided is an image generation apparatus that generates a still image from each frame image of a moving image recorded by an image processing apparatus that records a moving image used for generating a still image by a generation unit and comprises: a correction amount calculation unit configured to calculate, for each frame of the moving image, a correction amount for correction of a rolling shutter distortion of an image signal based on a shake amount detected by a camera shake amount detection unit; a correction unit configured to correct, for each frame, the rolling shutter distortion based on the correction amount; a residual correction amount calculation unit configured to calculate, for each frame, a residual correction amount, which is an amount of the rolling shutter distortion that is not corrected by the correction unit; and a recording unit configured to record the residual correction amount in association with an image for each frame of the moving image, wherein the generation unit corrects an image of a selected frame from among the images of the frames based on the associated residual correction amount, and generates a still image.

Further, according to the present invention, provided is an image processing method in which a moving image used for generating a still image is recorded, the method comprising: calculating, for each frame of the moving image, a correction amount for correction of a rolling shutter distortion of an image signal based on a shake amount detected by a camera shake amount detection unit; recording the correction amount in association with an image for each frame of the moving image; and correcting an image of a selected frame among the recorded images of the frames based on the associated correction amount and generating a still image.

Further, according to the present invention, provided is an image processing method in which a moving image used for generating a still image is recorded, the method comprising: calculating, for each frame of the moving image, a correction amount for correction of a rolling shutter distortion of an image signal based on a shake amount detected by a camera shake amount detection unit; correcting, for each frame, the rolling shutter distortion based on the correction amount; calculating, for each frame, a residual correction amount, which is an amount of the rolling shutter distortion that is not corrected in the correction step; recording the residual correction amount in association with an image for each frame of the moving image; and correcting an image of a selected frame from among the recorded images of the frames based on the associated residual correction amount, and generating a still image.

Further, according to the present invention, provided is a non-transitory readable storage medium having stored thereon a program which is executable by an image processing apparatus, the program having a program code for realizing an image processing method in which a moving image used for generating a still image is recorded, the method comprising: calculating, for each frame of the moving image, a correction amount for correction of a rolling shutter distortion of an image signal based on a shake amount detected by a camera shake amount detection unit; recording the correction amount in association with an image for each frame of the moving image; and correcting an image of a selected frame among the recorded images of the frames based on the associated correction amount and generating a still image.

Further, according to the present invention, provided is a non-transitory readable storage medium having stored thereon a program which is executable by an image processing apparatus, the program having a program code for realizing an image processing method in which a moving image used for generating a still image is recorded, the method comprising: calculating, for each frame of the moving image, a correction amount for correction of a rolling shutter distortion of an image signal based on a shake amount detected by a camera shake amount detection unit; correcting, for each frame, the rolling shutter distortion based on the correction amount; calculating, for each frame, a residual correction amount, which is an amount of the rolling shutter distortion that is not corrected in the correction step; recording the residual correction amount in association with an image for each frame of the moving image; and correcting an image of a selected frame from among the recorded images of the frames based on the associated residual correction amount, and generating a still image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Moving Image Shooting

Figure 1:
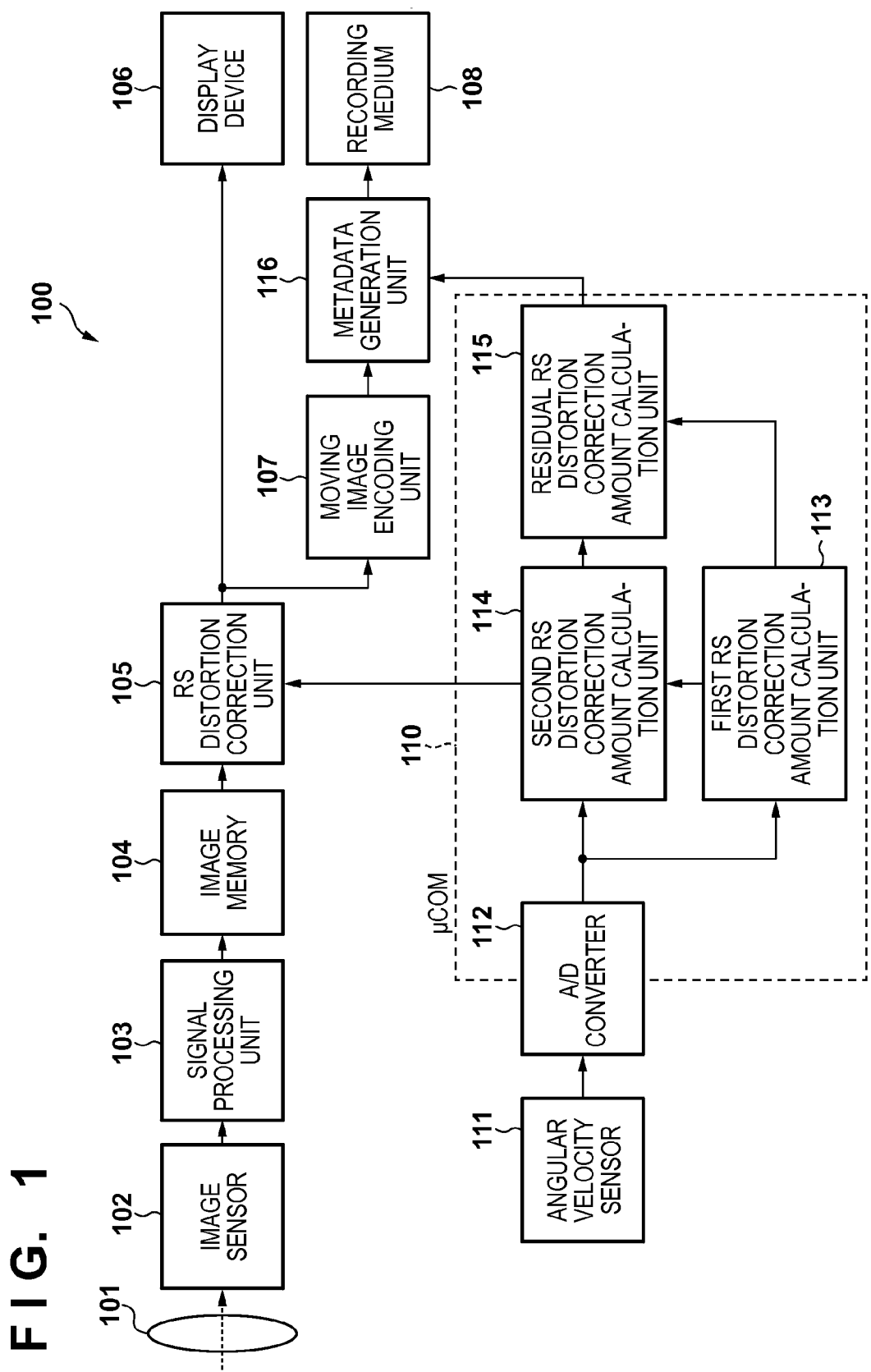
FIG. 1 is a block diagram illustrating examples of functional configurations of an image capturing apparatus according to a first embodiment of the present invention, at a time of moving image shooting.

FIG. 1 is a block diagram illustrating functional configurations of a video camera serving as an example of an image capturing apparatus 100 according to a first embodiment of the present invention, at a time of moving image shooting. Hereinafter, the functional configurations of the image capturing apparatus 100 of FIG. 1 and examples of their operations will specifically be described.

An image capturing optical system 101 for ƒms a subject image (not shown) on an image sensor 102. Note that although FIG. 1 shows the image capturing optical system 101 constituted by a single lens, the image capturing optical system 101 commonly includes a plurality of lenses such as a zoom lens and a focus lens, a diaphragm, and the like so as to be able to control zooming, focusing, an amount of incident light, and the like. The image sensor 102 of the present embodiment is a CMOS image sensor that includes a plurality of photoelectric conversion elements arranged two-dimensionally, and sequentially outputs accumulated electric charges at a different timing for each line in a frame period, from the upper section to the lower section of the image sensor 102. As described above, this driving method is referred to as a rolling shutter method, and hereinafter, "RS" refers to an abbreviation of "rolling shutter". The image sensor 102 converts, using the rolling shutter method, the subject image formed by the image capturing optical system 101 into electrical signals serving as image signals, and supplies the converted electrical signals to a signal processing unit 103. The signal processing unit 103 generates video signals complying with, for example, an NTSC format from the image signals obtained by the image sensor 102, and supplies the generated video signals to an image memory 104.

An angular velocity sensor 111 detects a shake of the image capturing apparatus 100 as an angular velocity signal, and supplies the angular velocity signal to an A/D converter 112. The A/D converter 112 digitalizes the angular velocity signal from the angular velocity sensor 111, and supplies the digitalized signal as angular velocity data to a first RS distortion correction amount calculation unit 113 and a second RS distortion correction amount calculation unit 114 provided inside a microcomputer (μCOM) 110.

An RS distortion correction unit 105 corrects a rolling shutter distortion generated in a captured image stored in the image memory 104 based on a calculation result of the second RS distortion correction amount calculation unit 114. The residual RS distortion correction amount calculation unit 115 calculates a residual rolling shutter distortion correction amount based on calculation results of the first RS distortion correction amount calculation unit 113 and the second RS distortion correction amount calculation unit 114, and supplies the calculated residual correction amount to a metadata generation unit 116.

A moving image encoding unit 107 compresses the video signals supplied from the RS distortion correction unit 105 into a predetermined format, and supplies the compressed video signals to the metadata generation unit 116. The metadata generation unit 116 generates metadata based on the data supplied from the residual RS distortion correction amount calculation unit 115, and records, in a recording medium 108, the generated metadata in association with moving image data that is output from the moving image encoding unit 107. Note that the metadata handled in the metadata generation unit 116 will be described in detail later.

The recording medium 108 may be, for example, a magnetic recording medium such as a hard disk, or an information recording medium such as a semiconductor memory, but is not limited to these. Furthermore, a display device 106 is constituted by, for example, a liquid crystal display element (LCD) or the like, and displays an image that is output from the RS distortion correction unit 105.

The following will specifically describe the operations of the RS distortion correction unit 105, the first RS distortion correction amount calculation unit 113, the second RS distortion correction amount calculation unit 114, the residual RS distortion correction amount calculation unit 115, and the metadata generation unit 116 according to the first embodiment.

Figure 2A:
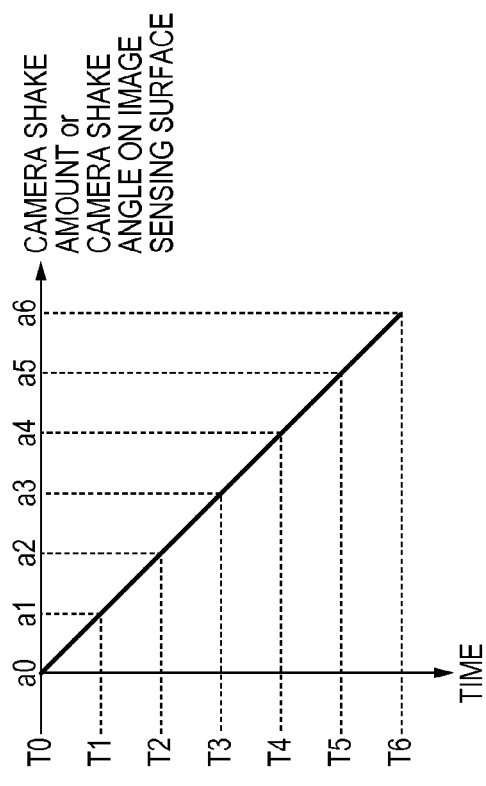
FIGS. 2A to 2C are diagrams illustrating operations of a first RS distortion correction amount calculation unit and a second RS distortion correction amount calculation unit according to the embodiment.
Figure 2B:
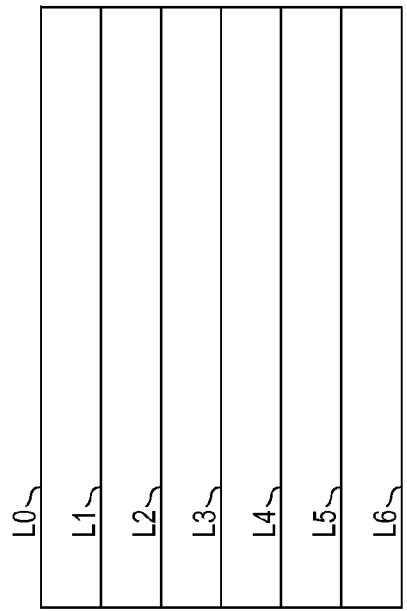
Figure 2C:
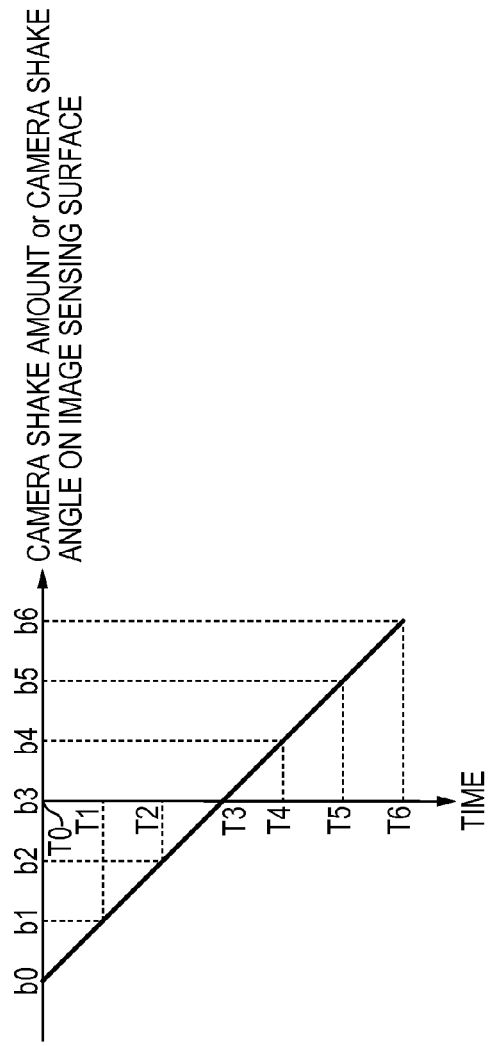

FIGS. 2A to 2C are diagrams illustrating operations of the first RS distortion correction amount calculation unit 113. FIG. 2A shows a captured image in which arbitrary image lines are denoted by L0 to L6. FIG. 2B is a graph for which an ordinate indicates the time and an abscissa indicates the temporal change in the camera shake amount or camera shake angle on an image sensing surface, the camera shake amount or camera shake angle being calculated based on the angular velocity data. Note that charge accumulation timings of the image lines L0 to L6 of the captured image of FIG. 2A respectively correspond to times T0 to T6. The graph of FIG. 2B shows the camera shake amount or camera shake angle gradually changing from the time T0 to the time T6.

The first RS distortion correction amount calculation unit 113 calculates camera shake amounts or camera shake angles a0 to a6 on the image sensing surface at the respective times T0 to T6 based on outputs of the A/D converter 112, and stores the calculated camera shake amounts or camera shake angles in a memory (not shown) provided inside the μCOM 110. Note here that the first RS distortion correction amount calculation unit 113 is described as being a unit for calculating seven pieces of data of the camera shake angles a0 to a6, but the number of pieces of data to be acquired is not limited to this. The number of pieces of data to be calculated is arbitrary as long as a plurality of pieces of camera shake angle data are calculated in synchronization with the charge accumulation timings of image lines of an image.

The first RS distortion correction amount calculation unit 113 further performs calculation for subtracting the camera shake angle a3 at the time T3 that corresponds to the charge accumulation timing of the image line L3 that extends in the image center of the captured image, from the camera shake angles a0 to a6. FIG. 2C is a graph illustrating the results of this calculation, and its ordinate and abscissa are the same as those of FIG. 2B. Assuming that shifted camera shake angles b0 to b6 are results obtained by subtracting the camera shake angle a3 from the camera shake angles a0 to a6, the calculation results are such that the camera shake angles a0 to a6 are shifted so that b3=0 is satisfied, as shown in FIG. 2C. The first RS distortion correction amount calculation unit 113 supplies the shifted camera shake angles b0 to b6 to the second RS distortion correction amount calculation unit 114 and the residual RS distortion correction amount calculation unit 115.

The second RS distortion correction amount calculation unit 114 uses the shifted camera shake angles b0 to b6 to perform calculation of data (RS distortion correction setting data) that is to be set in the RS distortion correction unit 105. Specifically, the second RS distortion correction amount calculation unit 114 determines whether or not the shifted camera shake angles b0 to b6 exceed a correction limit within which a rolling shutter distortion can be corrected using the method that will be described later, and if the shifted camera shake angles do not exceed the correction limit, the shifted camera shake angles b0 to b6 are set as the RS distortion correction setting data in the RS distortion correction unit 105. If the shifted camera shake angles b0 to b6 exceed the correction limit, the shifted camera shake angles b0 to b6 are corrected so that the RS distortion correction setting data falls within the correction limit. For example, in FIG. 2C, the RS distortion correction amounts that correspond to the shifted camera shake angles b1 and b5 are the correction limits, the shifted camera shake angles b0 to b6 are multiplied by a gain so that the maximum value of the shifted camera shake angles b0 to b6 falls within a range of the RS distortion correction amounts that correspond to the shifted camera shake angles b1 to b5.

Figure 3A:
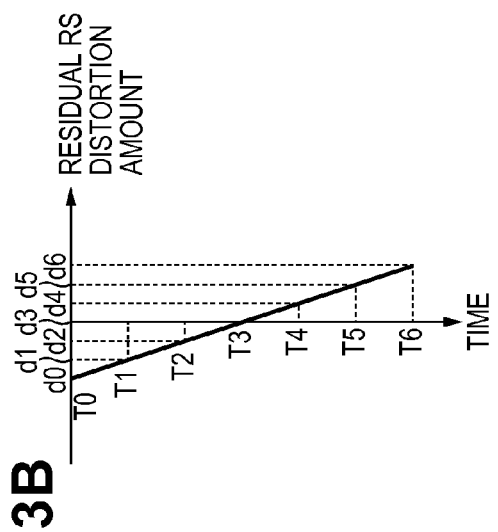
FIGS. 3A to 3D are diagrams illustrating operations of the second RS distortion correction amount calculation unit and a residual RS distortion correction amount calculation unit according to the embodiment.

FIG. 3A is a graph for which an ordinate indicates the same as that of FIG. 2B, and an abscissa indicates the RS distortion correction amount. Note that the units of the abscissas of FIG. 3A and FIG. 2C are the same. The solid line graph of FIG. 3A shows adjusted correction amounts c0 to c6, which are products obtained by multiplying the shifted camera shake angles b0 to b6 by a gain, and the dashed line graph shows the same graph as that of FIG. 2C. The second RS distortion correction amount calculation unit 114 sets the adjusted correction amounts c0 to c6 as the RS distortion correction setting data in the RS distortion correction unit 105.

Figure 4A:
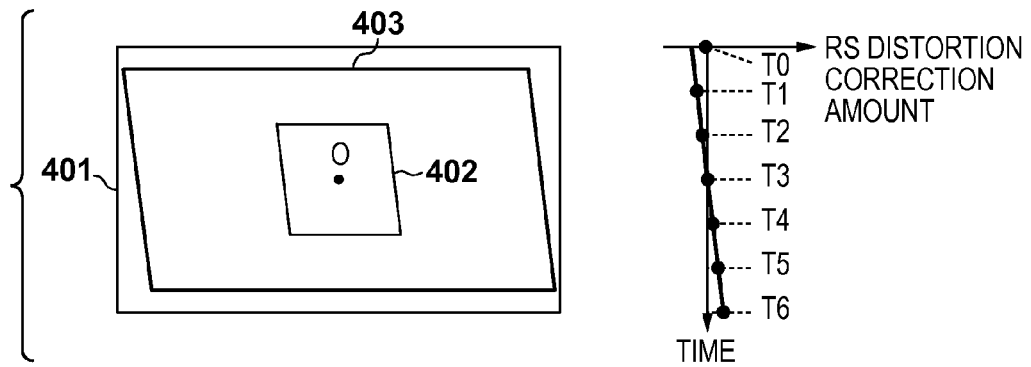
FIGS. 4A to 4D are diagrams illustrating rolling shutter distortion correction by an RS distortion correction unit according to the embodiment.
Figure 4B:
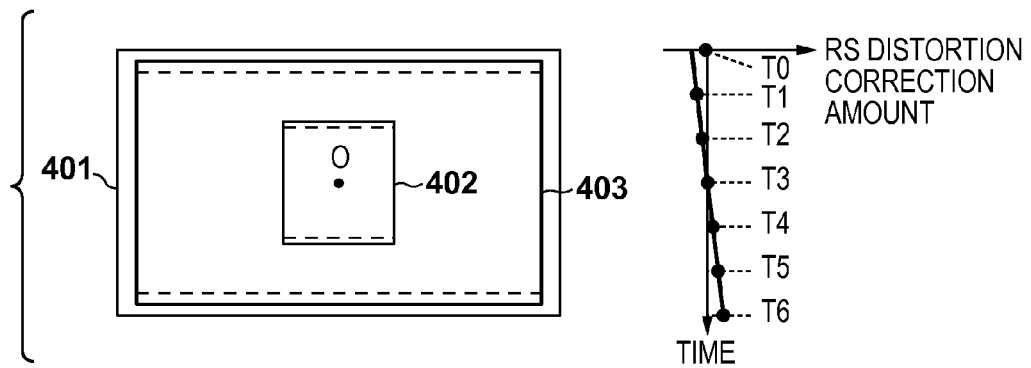
Figure 4C:
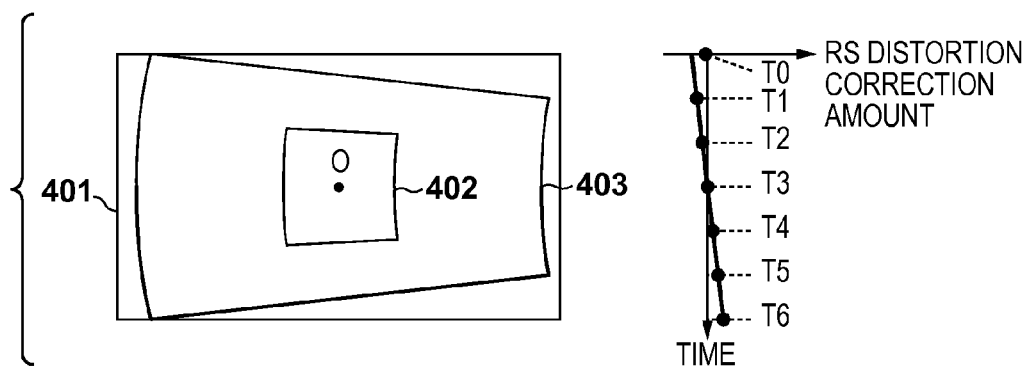
Figure 4D:
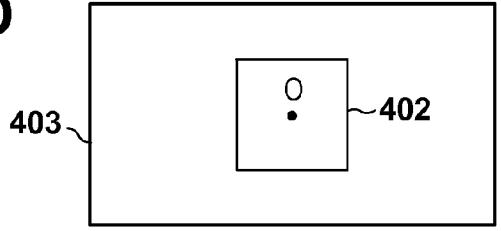

FIGS. 4A to 4D are diagrams illustrating methods in which the RS distortion correction unit 105 performs rolling shutter distortion correction based on the RS distortion correction setting data c0 to c6 calculated by the second RS distortion correction amount calculation unit 114. FIG. 4A shows correction of a rolling shutter distortion in the lateral direction of the image, FIG. 4B shows correction of a rolling shutter distortion in the longitudinal direction of the image, and FIG. 4C shows correction of a rolling shutter distortion in the rotating direction of the image. FIG. 4D shows the concept of an output image when the rolling shutter distortions of FIGS. 4A, 4B, and 4C are completely corrected.

The rectangle of FIG. 4A shows the range of an image 401 constituted by all pixels that can be obtained from the image sensor 102. A small parallelogram inside the image 401 indicates a subject 402 that was originally square-shaped and is captured while being distorted at an angle by a rolling shutter distortion caused by a shake of the image capturing apparatus 100 in the yaw direction. The graph on the right side of FIG. 4A is a graph for which an ordinate indicates the time and an abscissa indicates the correction amount of the rolling shutter distortion (RS distortion correction amount), and in which the pieces of RS distortion correction setting data at the times T0 to T6 are plotted.

The RS distortion correction unit 105 calculates, using a well-known method such as linear interpolation, polynomial approximation, or least squares, the RS distortion correction amounts that correspond to all the image lines of the captured image, based on the discrete RS distortion correction setting data at the times T0 to T6. The RS distortion correction unit 105 corrects the rolling shutter distortion by changing the image output start position in the horizontal direction every image line according to the RS distortion correction amounts. That is, by restricting an image readout range 403 as the large parallelogram of FIG. 4A, the rolling shutter distortion is corrected.

Furthermore, in FIG. 4B, the small and vertically long rectangle inside the image 401 indicates the subject 402 that was originally square-shaped and is distorted so as to extend vertically by a rolling shutter distortion caused by a shake of the image capturing apparatus 100 in the pitch direction. The graph on the right side of FIG. 4B is a graph for which an ordinate indicates the time and an abscissa indicates the RS distortion correction amount, and in which the pieces of RS distortion correction setting data at the times T0 to T6 are plotted.

As described above, the RS distortion correction unit 105 calculates the RS distortion correction amounts at the charge accumulation timings for all the image lines of the captured image, based on the discrete RS distortion correction setting data at the times T0 to T6. The RS distortion correction unit 105 corrects the rolling shutter distortion by shifting and changing the image readout lines up and down according to the RS distortion correction amounts. That is, by restricting the image readout range 403 as the rectangle immediately inside the range of the captured image of FIG. 4B, the rolling shutter distortion is corrected. Note that in FIG. 4B, the sections with the dotted lines show image readout ranges when the rolling shutter distortion is not corrected.

Similarly, in FIG. 4C, the small sector inside the image 401 indicates the subject 402 that was originally square-shaped and is captured while being distorted in the shape of a sector by a rolling shutter distortion caused by a shake of the image capturing apparatus 100 in the direction of rotation about the optical axis. The graph on the right side of FIG. 4C is a graph in which an ordinate indicates the time and an abscissa indicates the RS distortion correction amount, and in which the pieces of RS distortion correction setting data at the times T0 to T6 are plotted.

As described above, the RS distortion correction unit 105 calculates the RS distortion correction amounts at the charge accumulation timings corresponding to all the image lines of the captured image, based on the discrete RS distortion correction setting data at the times T0 to T6. The RS distortion correction unit 105 corrects the rolling shutter distortion by changing the image readout positions so as to rotate the image readout lines about the image center O serving as the original point according to the RS distortion correction amounts. That is, by restricting the image readout range 403 as the large sector-shaped figure of FIG. 4C, the rolling shutter distortion is corrected.

FIG. 4D shows, as described above, the output image that is obtained when the rolling shutter distortion is completely corrected without any distortion remaining uncorrected, and the subject that is distorted in FIGS. 4A to 4C is corrected to the original shape. The correction that gives a result as shown in FIG. 4D is performed when the data in the second RS distortion correction amount calculation unit 114 that was supplied from the first RS distortion correction amount calculation unit 113 does not exceed a correction limit, and is set without change as the RS distortion correction setting data in the RS distortion correction unit 105. On the other hand, when the data in the second RS distortion correction amount calculation unit 114 that was supplied from the first RS distortion correction amount calculation unit 113 exceeds the correction limit, the distortions of the subjects of FIGS. 4A to 4C approximate the state of FIG. 4D, but are not completely corrected.

The residual RS distortion correction amount calculation unit 115 calculates this residual rolling shutter distortion correction amount (residual RS distortion amount), and supplies the calculated residual rolling shutter distortion correction amount to the metadata generation unit 116. The following will describe calculation in the residual RS distortion correction amount calculation unit 115 with reference to FIGS. 3A and 3B. The residual RS distortion correction amount calculation unit 115 calculates differences between the camera shake amounts or shifted camera shake angles b0 to b6 (the dashed line of FIG. 3A) on the image sensing surface that are calculated by the first RS distortion correction amount calculation unit 113, and the RS distortion correction setting data c0 to c6 (the solid line of FIG. 3A) that are calculated by the second RS distortion correction amount calculation unit 114, at the respective times T0 to T6.

Figure 3B:
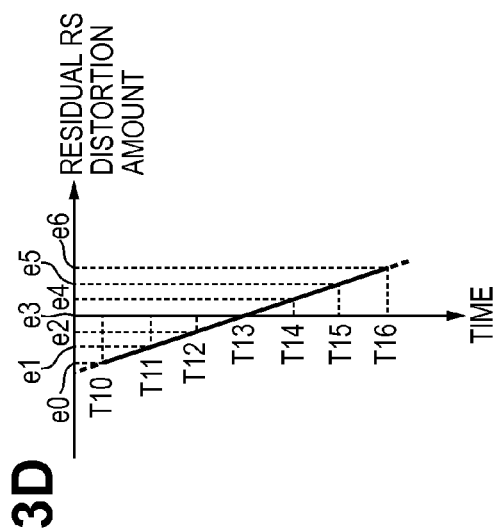

FIG. 3B is a graph showing the calculation results obtained by the calculation of bn−cn (n=0 to 6) with respect to the data at the respective times T0 to T6. Here, the calculation is given as the residual RS distortion amount dn=bn−cn (n=0 to 6).

Figure 3C:
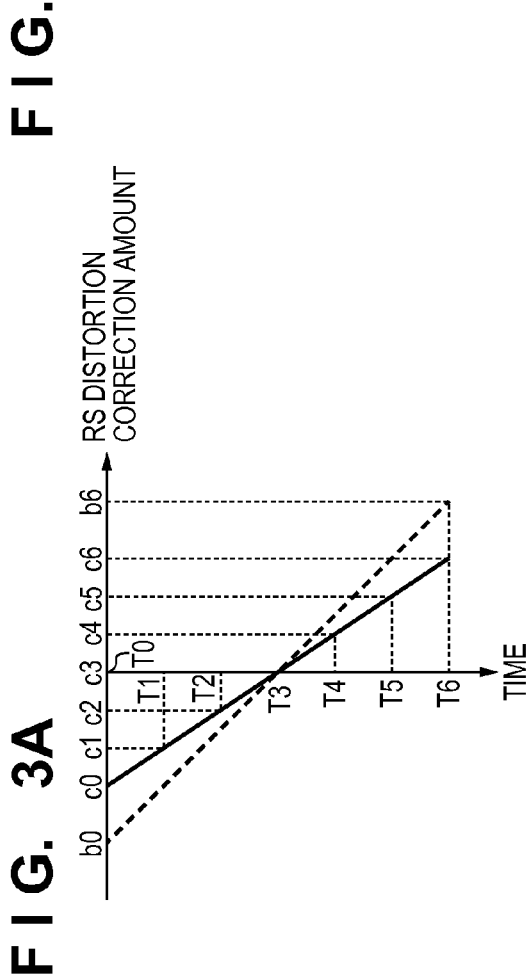
Figure 3D:
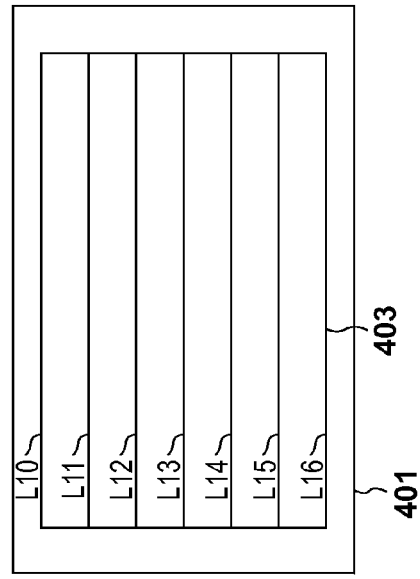

As described with reference to FIGS. 4A to 4D, the range of an output image subjected to the rolling shutter distortion correction is smaller than the captured image. Therefore, it is necessary to convert the data on the residual RS distortion amount into data that corresponds to the output image range. In FIG. 3C, the solid line rectangle indicates the captured image 401, and the solid line rectangle inside the captured image 401 indicates the output image 403. FIG. 3D is a graph for which an ordinate indicates the time and an abscissa indicates the residual RS distortion amount, as with in FIG. 3B. The residual RS distortion amount needs to be data that is associated with an output image. Therefore, as shown in FIG. 3C, the image lines on which data on the residual RS distortion amounts are recorded are set as L10 to L16 in the range of the output image 403. Then, the times that correspond to the charge accumulation timings of the image lines L10 to L16 are defined as T10 to T16, and the adjusted residual RS distortion amounts e0 to e6 at the times T10 to T16 are calculated, as shown in the graph of FIG. 3D. The calculation of the adjusted residual RS distortion amounts e0 to e6 is performed using a method such as linear interpolation or polynomial approximation interpolation, by adjusting the residual RS distortion amounts at the times T10 to T16 based on T0 to T6 and the residual distortion amounts d0 to d6 of the graph of FIG. 3B.

The residual RS distortion correction amount calculation unit 115 supplies the residual RS distortion amounts e0 to e6 to the metadata generation unit 116. The metadata generation unit 116 records, in the recording medium 108, the residual RS distortion amounts e0 to e6 in association with an image for each frame (frame image) that includes the residual RS distortion amount, as metadata. By repeatedly performing the above-described processing for a plurality of frames, a moving image is recorded.

Still Image Generation

Figure 5:
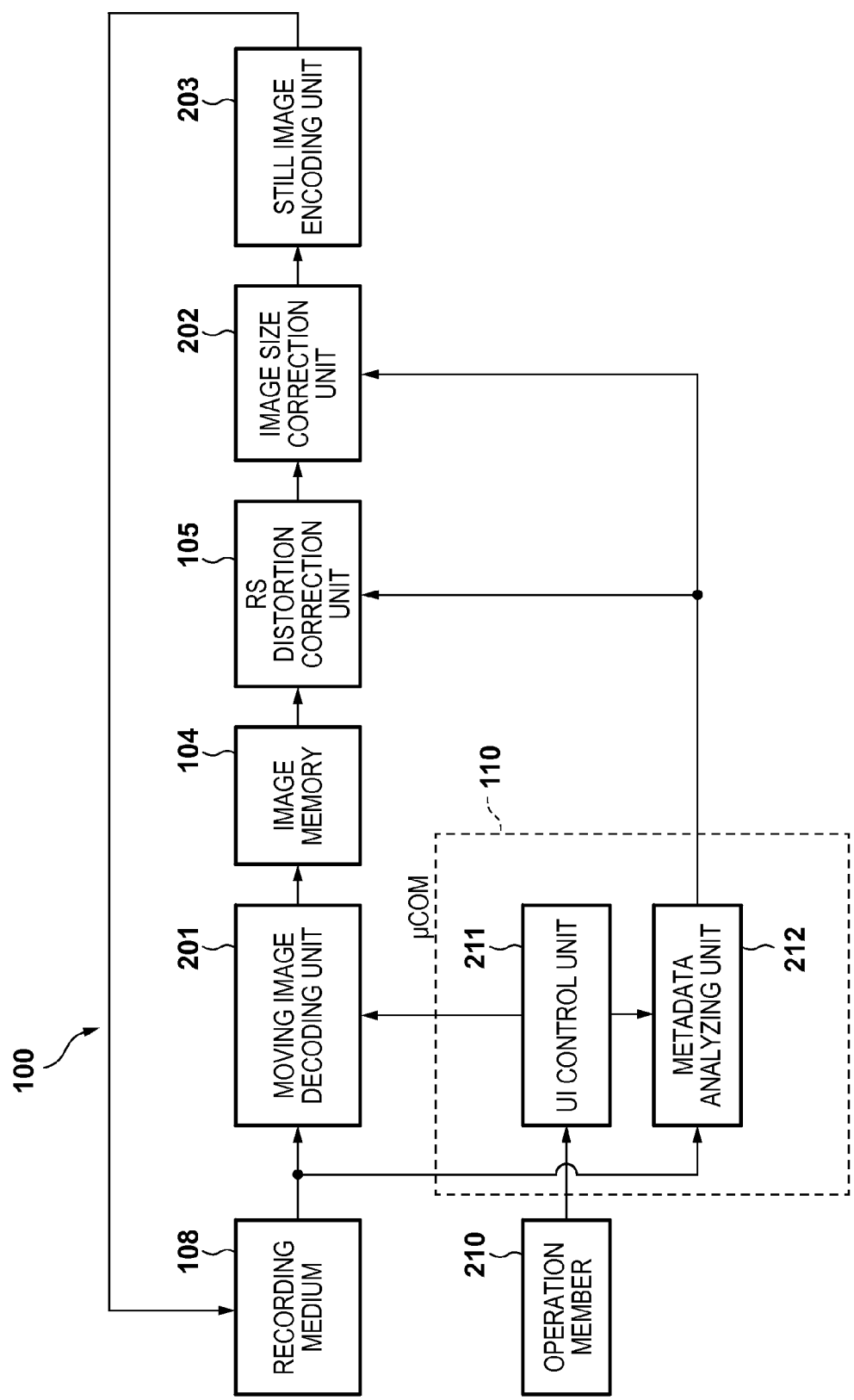
FIG. 5 is a block diagram illustrating examples of functional configurations, of the image capturing apparatus according to the embodiment, for generating a still image from a moving image.

The following will describe processing in which a user determines, from a moving image, a frame image that is used for generating a still image. FIG. 5 is a block diagram illustrating functional configurations, of a video camera that serves as an example of the image capturing apparatus 100 according to the first embodiment, for generating a still image from moving image data. Hereinafter, the functional configurations and examples of their operations will be described with reference to FIG. 5. Note that in FIG. 5, the same reference numerals are given to the functional configurations used in common with the case of moving image shooting described with reference to FIG. 1, and detailed descriptions thereof are omitted.

An operation member 210 is a member for a user to perform various types of operations, the operation member 210 being a touch panel, an arrow key, various types of buttons, or the like, for example. A UI control unit 211 provided inside the μCOM 110 performs processing for analyzing an operation of the operation member 210 by the user, and transmitting an instruction to an appropriate configuration block of the image capturing apparatus 100.

When the user operates the operation member 210 to designate a given frame (designated frame) of a shot moving image and the UI control unit 211 detects the operation for generating a still image, the UI control unit 211 transmits, to a moving image decoding unit 201, an instruction to decode the frame image of the designated frame. Furthermore, the UI control unit 211 transmits, to a metadata analyzing unit 212, an instruction to read out the metadata that is recorded in the recording medium 108 in association with the designated frame.

The moving image decoding unit 201 decodes the compressed moving image recorded in the recording medium 108 to generate a frame image of the designated frame, and stores the generated frame image in the image memory 104. The metadata analyzing unit 212 analyzes the metadata of the designated frame to determine whether or not a residual RS distortion amount is included. If a residual RS distortion amount is not included, the metadata analyzing unit 212 transmits an instruction not to perform rolling shutter distortion correction to the RS distortion correction unit 105, whereas if a residual RS distortion amount is included, the metadata analyzing unit 212 sets the residual RS distortion amount in the RS distortion correction unit 105.

The RS distortion correction unit 105 performs correction of the residual RS distortion amount in accordance with the instruction of the metadata analyzing unit 212. The metadata analyzing unit 212 analyzes the metadata of the designated frame, determines the image size of the still image, and sets the determined image size in an image size correction unit 202.

The image size correction unit 202 changes the image size in accordance with the instruction of the metadata analyzing unit 212. A still image encoding unit 203 encodes, using JPEG compression, the still image of the image size changed by the image size correction unit 202, and the eventual encoded still image data is recorded in the recording medium 108.

The following will describe in detail the operations of the correction of a residual RS distortion amount, by the metadata analyzing unit 212, the RS distortion correction unit 105, and the image size correction unit 202. As described above, when, in FIG. 1, data supplied from the first RS distortion correction amount calculation unit 113 to the second RS distortion correction amount calculation unit 114 exceeds the correction limit, the RS distortion correction unit 105 does not completely correct the rolling shutter distortion at a time of moving image shooting. Accordingly, a moving image in which the distortion of the subject remains is recorded in the recording medium 108. The operation when the image of the designated frame selected by the user includes the residual RS distortion amounts shown in the graph of FIG. 3D will be described with reference to FIGS. 6A to 6D.

Figure 6A:
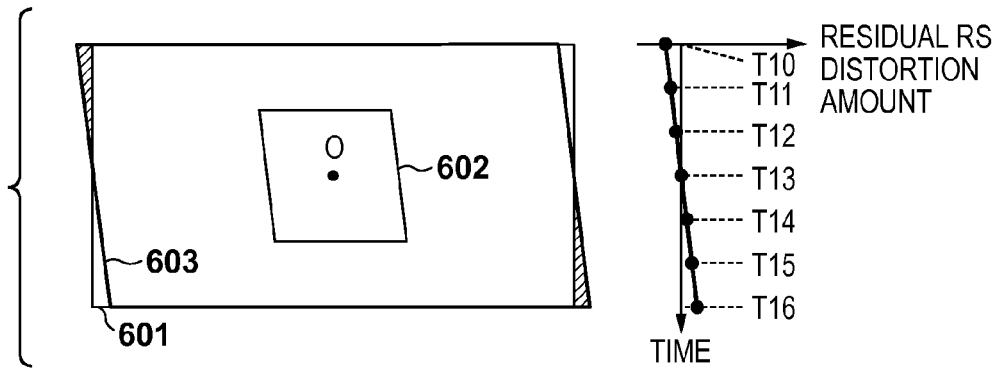
FIGS. 6A to 6D are diagrams illustrating correction of residual RS distortion amounts by the RS distortion correction unit according to the embodiment.
Figure 6B:
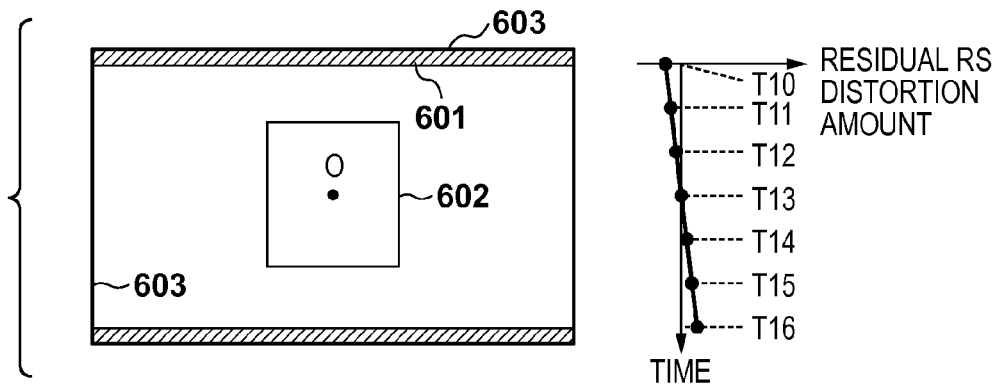
Figure 6C:
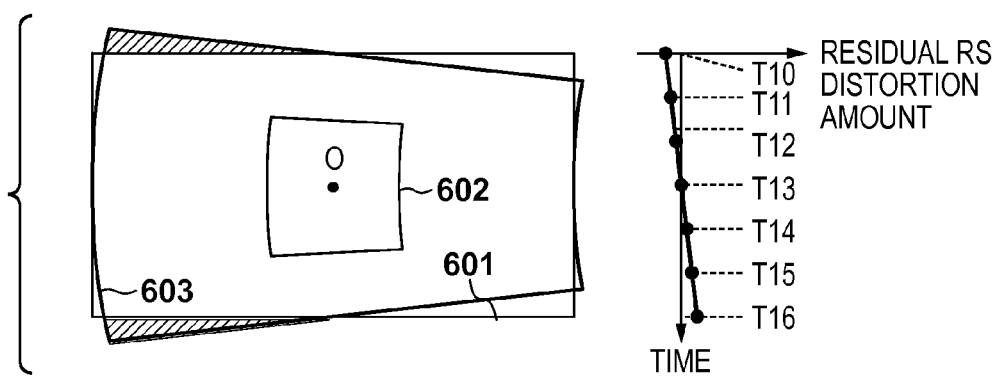
Figure 6D:
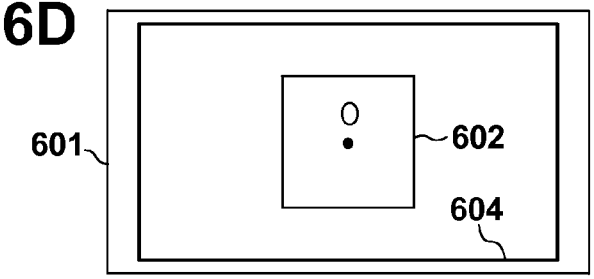

FIGS. 6A to 6D are diagrams illustrating, based on the data indicating the residual RS distortion amounts set by the metadata analyzing unit 212, the methods in which the RS distortion correction unit 105 performs correction of the residual RS distortion amounts. FIG. 6A shows correction in the lateral direction of the image, FIG. 6B shows correction in the vertical direction of the image, and FIG. 6C shows correction in the rotational direction of the image. FIG. 6D shows the image in which the residual RS distortion amounts of FIGS. 6A, 6B, and 6C are corrected.

The thin solid line rectangle in the figure on the left side of FIG. 6A indicates the range of a recorded image 601 recorded in the recording medium 108. The small parallelogram inside the recorded image 601 indicates a subject 602 that was originally square-shaped and is distorted at an angle by a rolling shutter distortion in the lateral direction, showing the state in which the rolling shutter distortion at a time of shooting is not completely corrected. The graph on the right side of FIG. 6A is a graph for which an ordinate indicates the time and an abscissa indicates the residual RS distortion amount, and in which the set data for the residual RS distortion amounts at the times T10 to T16 are plotted.

The RS distortion correction unit 105 performs correction of the residual RS distortion amounts by changing the image output start position in the horizontal direction every image line according to the residual RS distortion amounts. That is, by restricting an image readout range 603 as the large parallelogram with a thick line of FIG. 6A, the correction of the residual RS distortion amounts is realized.

Furthermore, in FIG. 6B, the small and vertically long rectangle inside the recorded image 601 also indicates the subject 602. Here, the subject 602 was originally square-shaped and is distorted so as to extend vertically by a rolling shutter distortion in the vertical direction, showing the state in which the rolling shutter distortion at a time of shooting is not completely corrected. The graph on the right side of FIG. 6B is a graph for which an ordinate indicates the time and an abscissa indicates the residual RS distortion amount, and in which the set data for the residual RS distortion amounts at the times T10 to T16 are plotted.

The RS distortion correction unit 105 performs correction of the residual RS distortion amounts by shifting and changing the image readout lines up and down according to the residual RS distortion amounts. That is, by restricting the image readout range 603 as the thick line parallelogram of FIG. 6B, the correction of the residual RS distortion amounts is realized.

Similarly, in FIG. 6C, the small sector inside the recorded image 601 also indicates the subject 602. Here, the subject 602 was originally square-shaped and is distorted in the shape of a sector by a rolling shutter distortion in the rotational direction of the image, showing the state in which the rolling shutter distortion at a time of shooting is not completely corrected. The graph on the right side of FIG. 6C is a graph an for which ordinate indicates the time and an abscissa indicates the residual RS distortion amount, and in which the set data for the residual RS distortion amounts at the times T10 to T16 are plotted.

The RS distortion correction unit 105 performs correction of the residual RS distortion amounts by changing the image readout position so as to rotate the image readout lines about the image center O serving as the original point according to the residual RS distortion amounts. That is, by restricting the image readout range 603 as the large sector with a thick line of FIG. 6C, the correction of the residual RS distortion amounts is realized.

FIG. 6D shows the image in which the residual RS distortion amounts are corrected in a manner as described above, and the subject that is distorted in FIGS. 6A to 6C is corrected to the original shape. The outermost rectangle with a thin solid line of FIG. 6D indicates the range of the recorded image 601 as with in FIGS. 6A to 6C. Furthermore, a range 604 with a thick line inside this outermost rectangle indicates an output range of the image to be generated as a still image. This output range is determined by the image size correction unit 202.

In the figures on the left sides of FIGS. 6A to 6C, hatched regions between the image readout range 603 on which correction of the residual RS distortion amounts is performed and the recorded image 601 are regions in which no video signal is present. An image having the same size as the recorded image cannot be generated as a still image. Accordingly, the image size correction unit 202 determines the range of the output image 604 such that only a region in which a video signal is present is output.

The method for determining the range of the output image 604 by the image size correction unit 202 will be described with reference to FIGS. 6A to 6C. In the figure on the left side of FIG. 6A, the image readout range 603 includes, in the lateral direction of the image, regions in which no video signal is present. At that time, by calculating the maximum value of the absolute values of the residual RS distortion amounts in the graph on the right side and reducing the output image range by that maximum value in the lateral direction, it is possible for an image that is to be generated as a still image not to include the regions in which no video signal is present.

In the figure on the left side of FIG. 6B, the image readout range 603 includes, in the vertical direction of the image, regions in which no video signal is present. At that time, if the residual RS distortion amounts at the times T10 and T16 in the graph on the right side are present in the direction in which the image is reduced and the residual RS distortion amounts are corrected, the output image range is reduced by those amounts in the vertical direction. The direction in which the image is reduced refers to the direction in which the residual RS distortion amount is a minus value at times above T13, or the direction in which the residual RS distortion amount is a plus value at times below T13.

On the figure on the left side of FIG. 6C, the image readout range 603 includes, on both the vertical and lateral sides of the image, regions in which no video signal is present. First, with respect to the vertical direction, readout coordinates of the pixels at four corners of a recorded image are calculated based on the residual RS distortion amounts at the times T10 and T16 in the graph on the right side, and the output image range is set so that the image readout range does not exceed the recorded image 601 with respect to the vertical direction. Furthermore, with respect to the lateral direction, the readout coordinates of the pixels on the right or left side of the lines of the recorded image 601 that correspond to all the times T10 to T16 (excluding T13) are calculated. Then, the output image range is set so that the image readout range does not exceed the recorded image 601 with respect to the lateral direction. Note that with respect to the selection of the left or right side, at times above T13, the right side is selected when the residual RS distortion amount is a minus value, and the left side is selected when the residual RS distortion amount is a plus value. In contrast, at times below T13, the left side is selected when the residual RS distortion amount is a minus value, and the right side is selected when the residual RS distortion amount is a plus value.

As described above, in the first embodiment of the present invention, a residual RS distortion correction amount occurred at a time of moving image shooting is calculated by the residual RS distortion correction amount calculation unit 115, and is recorded as metadata in association with each frame of a moving image. Furthermore, when a still image is generated from each frame of a moving image in accordance with an instruction of a user, correction of the residual RS distortion correction amount is performed based on the metadata, the image size is appropriately corrected, and a still image is generated. This prevents the residual RS distortion correction amount that is permitted in the moving image from becoming apparent in the generated still image and deteriorating the quality of the still image, making it possible to generate an image most suitable for a still image.

Second Embodiment

Moving Image Shooting

Figure 7:
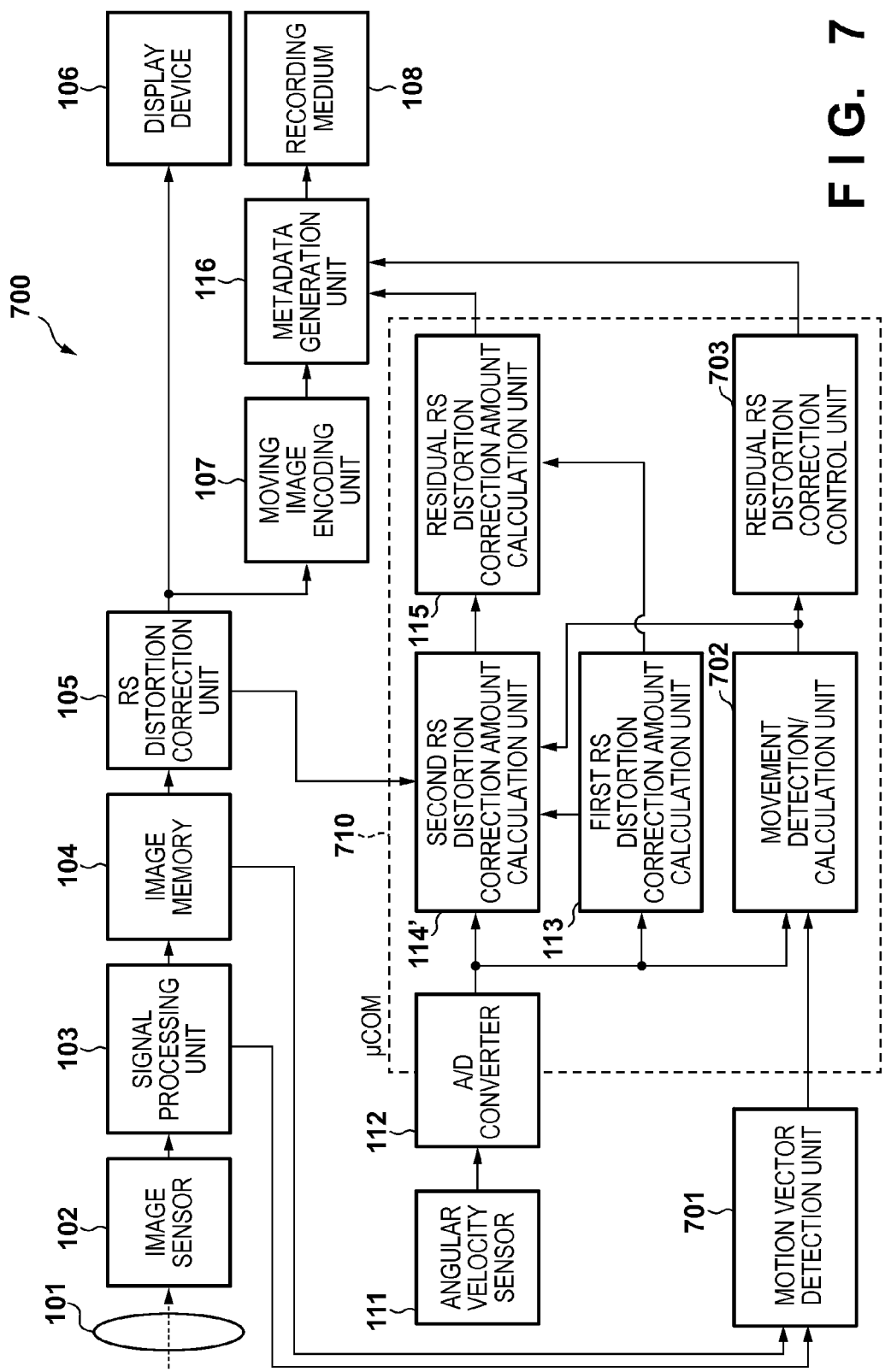
FIG. 7 is a block diagram illustrating examples of functional configurations, of an image capturing apparatus according to a second embodiment, for moving image shooting.

Hereinafter, a second embodiment of the present invention will be described. FIG. 7 is a block diagram illustrating functional configurations, of a video camera serving as an example of an image capturing apparatus 700 according to a second embodiment, for moving image shooting. FIG. 7 is a diagram obtained by adding, to the configuration shown in FIG. 1, a motion vector detection unit 701, a movement detection/calculation unit 702, and a residual RS distortion correction control unit 703. Furthermore, a second RS distortion correction amount calculation unit 114' switches the processing depending on information from the movement detection/calculation unit 702. Note that the same reference numerals are given to the same functional configurations as those of FIG. 1, and descriptions thereof are omitted.

The motion vector detection unit 701 detects a motion vector of an image based on a brightness signal included in the current video signal generated by the signal processing unit 103, and a brightness signal included in the video signal of one frame before that is stored in the image memory 104. The output of the motion vector detected by the motion vector detection unit 701 is supplied to the movement detection/calculation unit 702.

The movement detection/calculation unit 702 determines, based on the result of the motion vector detection by the motion vector detection unit 701, whether or not there is a moving subject on an image capturing screen, and whether or not a photographer is performing shooting while chasing (tracking) a moving subject. Furthermore, the speed of movement of the captured image that was caused by a movement of the image capturing apparatus 700 is calculated based on the output from the A/D converter 112 or an output from the motion vector detection unit 701.

Figure 8A:
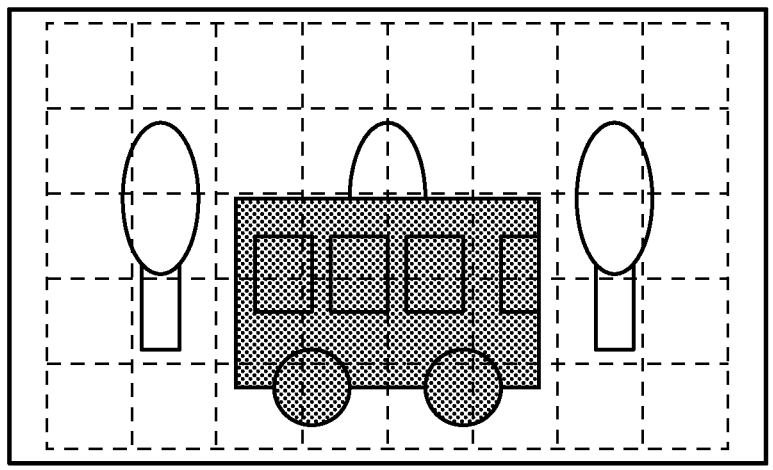
FIGS. 8A and 8B are diagrams illustrating processing of a movement detection/calculation unit according to the second embodiment.

The processing of the movement detection/calculation unit 702 will be described with reference to FIGS. 8A and 8B. FIG. 8A shows an image that is shot so that the moving subject in the center of the screen is held in the center of the screen (so that the subject is tracked). The motion vector detection is performed by a block matching method in which an image is divided into a plurality of blocks and a motion vector in each block is calculated, and the dashed lines indicate blocks for use in the motion vector detection.

Figure 8B:
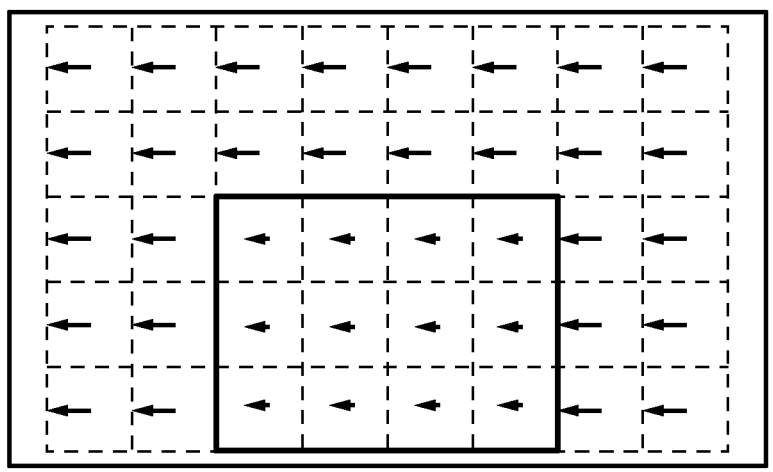

FIG. 8B shows the motion vector detection results of the blocks using the direction and sizes of the arrows. The motion vectors inside the thick line frame show motion vectors of the moving subject, and motion vectors outside the thick line frame show motion vectors in the background region other than the moving subject. First, when there are two or more regions of different motion vector sizes as shown in FIG. 8B, the movement detection/calculation unit 702 determines that there is a moving subject on the image capturing screen.

Then, the movement detection/calculation unit 702 specifies the regions of the different motion vector sizes that respectively correspond to the moving subject region and the background region. A well-known method, such as a method in which a region extending to a wider range in the screen is defined as the background region, is used as the specifying method. In FIG. 8B, the region in the thick line frame is specified as the moving subject region. Then, the absolute value of the average of the motion vectors in the background region is compared with the absolute value of the average of the motion vectors in the moving subject region, and if the absolute value of the average of the motion vectors in the moving subject region is smaller, it will be determined that shooting with a moving subject tracked is performed. This is because, when the motion vectors in the moving subject region are zero, it indicates that shooting is performed in a manner that movement of the moving subject is completely tracked, that is to say, it is determined that shooting with a moving subject tracked is performed when the motion vectors in the moving subject region are close to zero.

Furthermore, the movement detection/calculation unit 702 calculates the speed of movement of the captured image that was caused by a movement of the image capturing apparatus 700. The calculation performed here may use an output of either the motion vector detection unit 701 or the A/D converter 112. When an output of the motion vector detection unit 701 is used, the movement speed is calculated using the motion vectors of the background region. Furthermore, the output of the A/D converter 112 is a signal indicating the angular velocity of the image capturing apparatus 700, and thus calculation for converting the signal into the speed of movement on the image sensing surface is performed.

The result of the determination of the movement detection/calculation unit 702 whether or not shooting with a moving subject tracked is performed is supplied to the second RS distortion correction amount calculation unit 114 and the residual RS distortion correction control unit 703. Furthermore, the movement speed is supplied to the residual RS distortion correction control unit 703.

Upon receiving the determination result that the moving subject is tracked from the movement detection/calculation unit 702, the second RS distortion correction amount calculation unit 114' sets, in the RS distortion correction unit 105, the RS distortion correction setting data indicating that rolling shutter distortion correction is not performed. Alternatively, RS distortion correction setting data may be set so that the correction amount is reduced. The reason thereof is as follows.

Figure 9A:
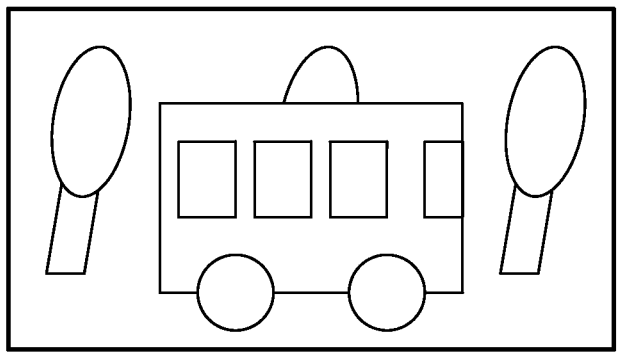
FIGS. 9A to 9D are diagrams illustrating processing of the movement detection/calculation unit and a residual RS distortion correction control unit according to the second embodiment.
Figure 9B:
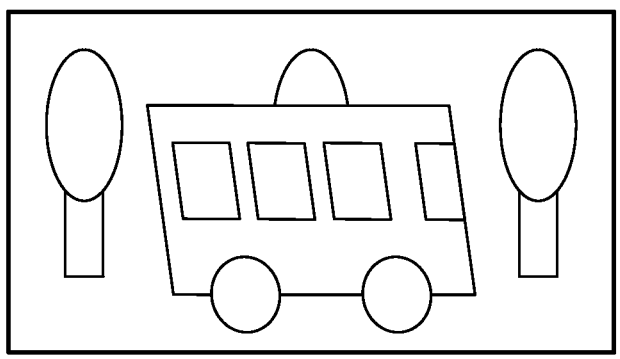

FIG. 9A shows an image that is shot so that a moving subject in the center of the screen is held in the center of the screen. In this case, the background region is distorted at an angle due to the movement of the image capturing apparatus tracking the moving subject, but the position of the moving subject on the screen does not change and thus the distortion of the moving subject is small. FIG. 9B shows an image in which the diagonal rolling shutter distortion in the background region is corrected, and the undistorted moving subject in FIG. 9A is distorted at an angle. In order to prevent the moving subject from being distorted in such a manner, the second RS distortion correction amount calculation unit 114' sets, in the RS distortion correction unit 105, the RS distortion correction setting data indicating that rolling shutter distortion correction is not performed, as described above.

The residual RS distortion correction control unit 703 calculates a gain (residual RS distortion gain), based on the movement speed and the determination result of the movement detection/calculation unit 702 as to whether or not shooting with a moving subject tracked is performed. The gain calculated here shows an extent of correction of the residual RS distortion amount calculated by the residual RS distortion correction amount calculation unit 115. Then, this residual RS distortion gain is supplied, together with the residual RS distortion amount, to the metadata generation unit 116. The metadata generation unit 116 generates predefined metadata based on the data supplied form the residual RS distortion correction amount calculation unit 115 and the residual RS distortion correction control unit 703, and records, in the recording medium 108, the generated metadata in association with the moving image data to be output from the moving image encoding unit 107.

Figure 10:
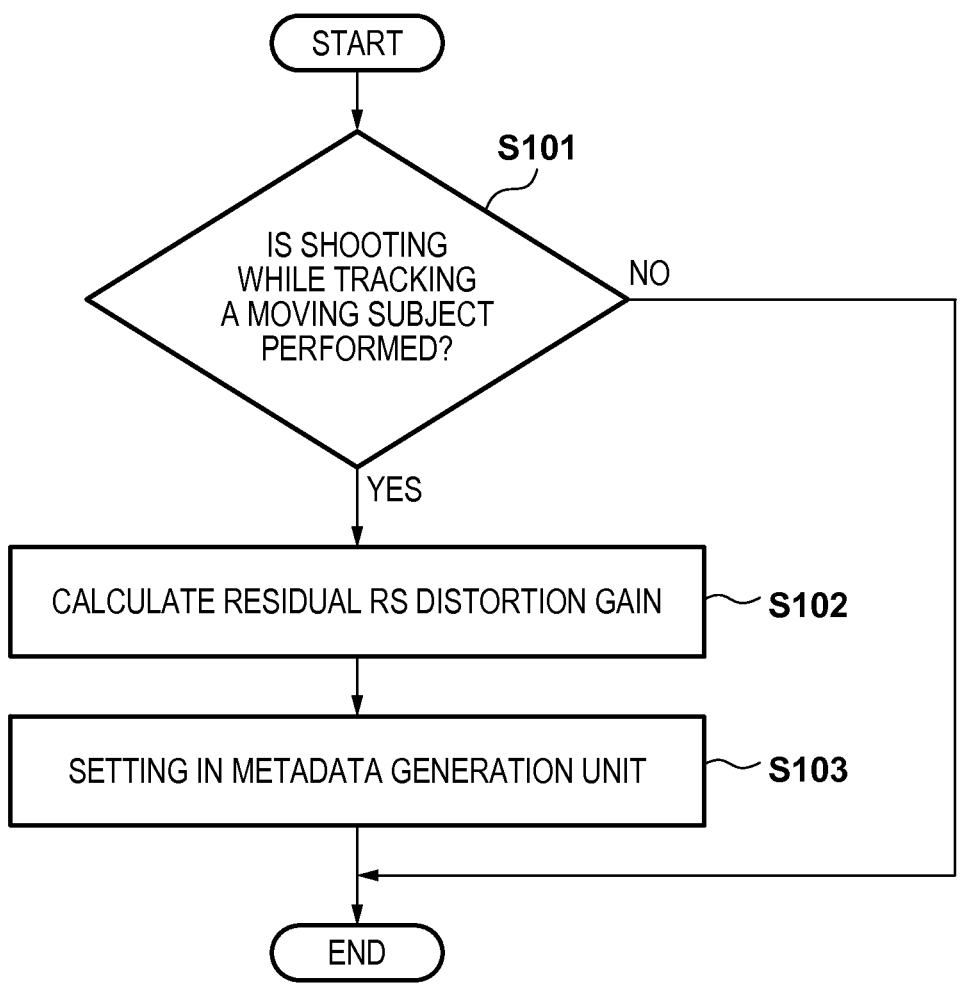
FIG. 10 is a flowchart illustrating processing of the residual RS distortion correction control unit according to the second embodiment.

The following will describe an example of processing for determining a residual RS distortion gain that is performed in the residual RS distortion correction control unit 703 with reference to the flowchart of FIG. 10. FIG. 10 is a flowchart illustrating an example of processing performed in the residual RS distortion correction control unit 703. In step S101, the movement detection/calculation unit 702 determines whether or not a photographer is performing shooting with a moving subject tracked. If the determination in step S101 is No, the processing of the flowchart in FIG. 10 ends. If the determination in step S101 is Yes, the procedure advances to step S102. In step S102, a residual RS distortion gain is calculated. The processing in step S102 will be described in detail later. After step S102, the procedure advances to step S103, where the data on the residual RS distortion gain is set in the metadata generation unit 116.

Then, the processing performed in step S102 will be described in detail. As a first example, in step S102, the residual RS distortion gain is unconditionally set to zero or a value close to zero (a value smaller than a first threshold). Accordingly, irrespective of the data from the residual RS distortion correction amount calculation unit 115 that is set in the metadata generation unit 116, correction of the residual RS distortion amount by the RS distortion correction unit 105 is not performed or nearly not performed at a time of generation of a still image. That is, it is possible to prevent the moving subject from being distorted as in FIG. 9B.

Figure 9C:
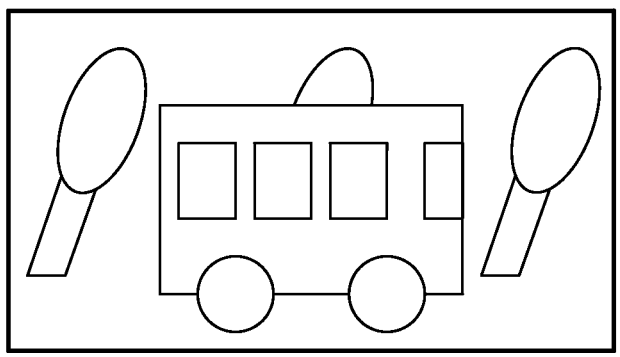
Figure 9D:
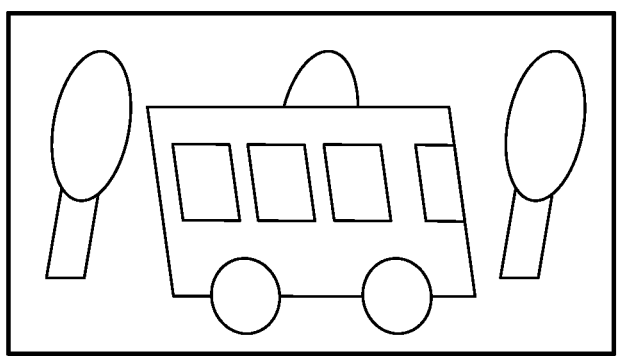
Figure 11A:
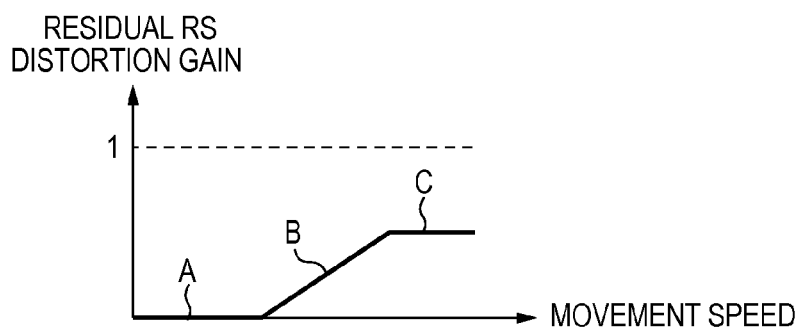
FIGS. 11A to 11C are graphs for illustrating processing of step S102 of FIG. 10.

A second example of the processing performed in step S102 will be described with reference to FIG. 11A. FIG. 11A is a graph for which an abscissa indicates the movement speed calculated by the movement detection/calculation unit 702 and an ordinate indicates the residual RS distortion gain. In FIG. 11A, the residual RS distortion gain is changed according to the movement speed. Specifically, the residual RS distortion gain is set to zero (A of FIG. 11A) when the movement speed is low (value equal to or smaller than a second threshold), and the residual RS distortion gain is increased with an increase in the movement speed (B of FIG. 11A). The residual RS distortion gain is clipped at a value of less than 1 at a predetermined movement speed (C of FIG. 11A). The reason thereof is as follows. FIG. 9C shows an image that is shot so that a moving subject in the center of the screen is held in the center of the screen, in which shooting is performed while chasing the subject that is moving at a higher speed than that of FIG. 9A. In this case, the state in which a large distortion occurs only in the background region and the moving subject is not distorted seems to be rather unnatural. Therefore, by increasing the residual RS distortion gain with an increase in the movement speed, the state as shown in FIG. 9D in which both the moving subject region and the background region are distorted is realized so as to perform control for mitigating the unnatural view as described above.

Figure 11B:
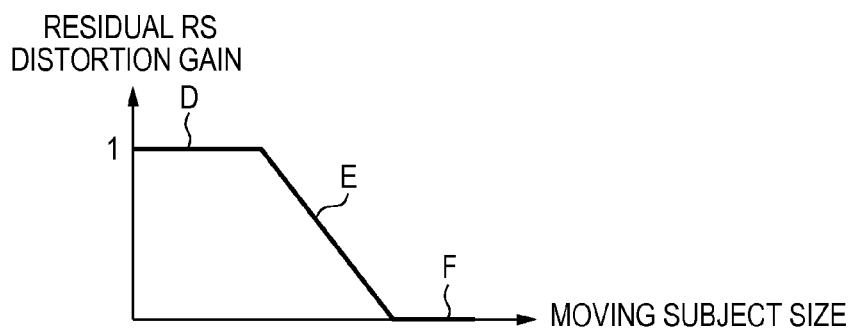

A third example of the processing performed in step S102 will be described with reference to FIG. 11B. The graph of FIG. 11B is a graph for which an abscissa indicates the moving subject size and an ordinate indicates the residual RS distortion gain. The moving subject size is calculated by the movement detection/calculation unit 702 based on the detection result of the motion vector detection unit 701. Specifically, the data that corresponds to the area of the thick line frame of FIG. 8B is calculated. The result calculated by the movement detection/calculation unit 702 is supplied to the residual RS distortion correction control unit 703, and the residual RS distortion correction control unit 703 changes the residual RS distortion gain according to the moving subject size. In FIG. 11B, the residual RS distortion gain is set to one (D of FIG. 11B) when the moving subject size is small (equal to or smaller than a third threshold), and all the residual RS distortion amounts are corrected at a time of generation of a still image. The residual RS distortion gain is decreased (E of FIG. 11B) with an increase in the moving subject size, and the residual RS distortion gain is set to zero (F of FIG. 11B) when the moving subject size is a predetermined size or lager. The reason thereof is as follows. That is, when the moving subject size is small, a distortion in the background region is more noticeable than in the moving subject region, and thus it is preferable that the distortion in the background region is reduced. When the moving subject size is increased, a distortion of the moving subject region becomes noticeable, and thus it is preferable that the distortion in the moving subject region is reduced.

Figure 11C:
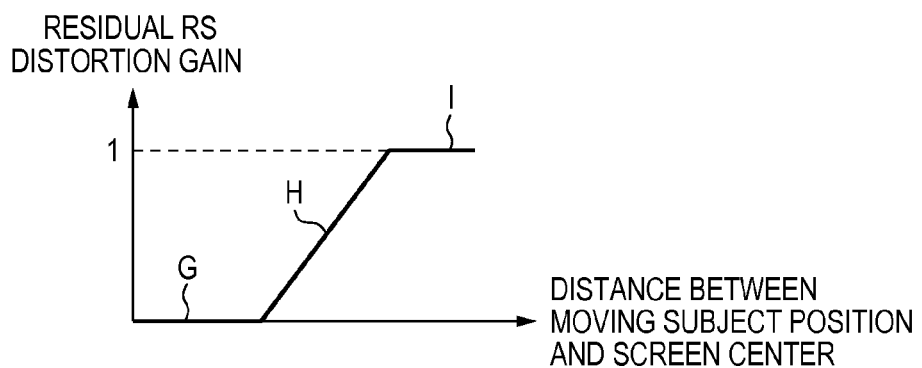

A forth example of the processing performed in step S102 will be described with reference to FIG. 11C. The graph of FIG. 11C is a graph for which an abscissa indicates the distance of the moving subject position from the center of the screen and an ordinate indicates the residual RS distortion gain. The distance of the moving subject position from the center of the screen is calculated by the movement detection/calculation unit 702 based on the detection result of the motion vector detection unit 701. Specifically, the data that corresponds to the distance between the central coordinate of the thick line frame of FIG. 8B and the central coordinate of the entire image thereof is calculated. The result calculated in the movement detection/calculation unit 702 is supplied to the residual RS distortion correction control unit 703, and the residual RS distortion correction control unit 703 changes the residual RS distortion gain according to the distance of the moving subject position from the center of the screen. In FIG. 11C, when the distance of the moving subject position from the center of the screen is small, the residual RS distortion gain is set to zero (G of FIG. 11C), and correction of the residual RS distortion amount is not performed at a time of generation of a still image. The residual RS distortion gain is increased (H of FIG. 11C) with an increase in the distance of the moving subject position from the center of the screen (to a value equal to or greater than a fourth threshold), and the residual RS distortion gain is set to one (I of FIG. 11C) when the distance is a predetermined value or larger. The reason thereof is as follows. That is, when the moving subject position on the screen is in the vicinity of the center, a distortion in the moving subject region is more noticeable than in the background region, and thus it is preferable that the distortion in the moving subject region is reduced. As the position of the moving subject on the screen is apart from the vicinity of the center, a distortion in the background region is noticeable, and thus it is preferable that the distortion in the background region is reduced.

Note that the procedures that have been described with reference to the graphs of FIGS. 11A to 11C and are for setting the residual RS distortion gain according to the movement speed, the moving subject size, and distance of the moving subject position from the center of the screen may be used in combination. For example, when the moving subject position is apart from the center, the procedure according to the graph of FIG. 11C is performed, and when the moving subject position is in the vicinity of the center, the procedure according to the graph of FIG. 11B is performed. Furthermore, various types of combinations may be used, such that the procedure according to FIG. 11B is performed while the moving subject is small, and the procedure according to FIG. 11A is performed while the moving subject is large.

Still Image Generation

Processing in which an image of a frame that is used for generating a still image is determined from a moving image by a user and the still image is generated is the same as that described in the first embodiment with reference to FIG. 5, except for the processing of the metadata analyzing unit 212. The metadata analyzing unit 212 reads out a residual RS distortion correction amount and a residual RS distortion gain from data recorded as metadata in the recording medium 108. Then, the product obtained by multiplying the residual RS distortion correction amount by the residual RS distortion gain is set in the RS distortion correction unit 105. The RS distortion correction unit 105 performs correction of the residual RS distortion amount according to the set data.

The present invention has been described above in detail based on its preferable embodiments, but the present invention is not limited to these specific embodiments, and various modifications are included in the present invention without departing from the spirit of the invention. For example, instead of an output of the angular velocity sensor 111, an output of the motion vector detection unit 701 may be used, or a configuration is also possible in which a mechanism for mechanically correcting a distortion of the image capturing apparatus is provided. In this case, a rolling shutter distortion of a captured image occurs when the distortion cannot completely be corrected by the mechanism for mechanically correcting a distortion, and thus a rolling shutter distortion correction amount is calculated by subtracting the amount of correction made by the mechanism for mechanically correcting a distortion.

Note that the present invention is applicable to an image capturing system constituted by a plurality of devices (for example, an image capturing apparatus, an image processing apparatus, an interface device, and the like), or an apparatus constituted by a single device (such as a video camera).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183494, filed on Sep. 9, 2014 which is hereby incorporated by reference herein in its entirety.

What is claimed is:

1. An image processing apparatus that records a moving image used for generating a still image, comprising:
    at least one processor or at least one circuitry programmed to function as:
        a correction amount calculation unit that calculates, for each frame of the moving image, a correction amount for correction of a rolling shutter distortion of an image signal based on a shake amount of an image capturing apparatus;
        a correction unit that corrects, for each frame, the rolling shutter distortion based on the correction amount;
        a residual correction amount calculation unit that calculates, for each frame, a residual correction amount, which is an amount of the rolling shutter distortion that is not corrected by the correction unit; and
        a recording unit that records the residual correction amount in association with an image for each frame of the moving image,
    wherein the associated residual correction amount is used for correcting an image of a selected frame from among the images of the frames, and a still image is generated from the corrected image of the selected frame.

2. The image processing apparatus according to claim 1, wherein the image size of the still image is changed according to pixels that are used at a time of correction of the residual correction amount.

3. The image processing apparatus according to claim 1, wherein the image size of the still image is changed according to pixels that are used at a time of correction of the correction amount.

4. The image processing apparatus according to claim 1, further comprising an image sensor that includes a plurality of pixel lines, and is configured to sequentially output image signals of a plurality of frames while changing a charge accumulation timing and a readout timing for each pixel line in a frame period.

5. The image processing apparatus according to claim 1, wherein the at least one processor or at least one circuitry is further programmed to function as:
   a movement detection unit that detects movement of a subject in the image; and
   a setting unit that sets, when the subject is moving, a gain for attenuating a strength of correction of the residual correction amount.

6. The image processing apparatus according to claim 5, wherein when the movement detection unit detects shooting with the subject tracked, the setting unit sets the gain to a value lower than a first threshold.

7. The image processing apparatus according to claim 5, wherein when movement speed of the subject is higher than a second threshold, the setting unit sets the gain to a value higher than that in the case where the movement speed of the subject is the second threshold or lower.

8. The image processing apparatus according to claim 5, wherein when a size of the subject in the image is larger than a third threshold, the setting unit sets the gain to a value lower than that in the case where the size of the subject is the third threshold or smaller.

9. The image processing apparatus according to claim 5, wherein when a distance between the subject and the center of the image is a fourth threshold or greater, the setting unit sets the gain to a value higher than that in the case where the distance is smaller than the fourth threshold.

10. An image capturing apparatus comprising:
    an image sensor; and
    an image processing apparatus that records a moving image used for generating a still image and comprises at least one processor or at least one circuitry programmed to function as:
       a correction amount calculation unit that calculates, for each frame of the moving image, a correction amount for correction of a rolling shutter distortion of an image signal based on a shake amount of the image capturing apparatus;
       a correction unit that corrects, for each frame, the rolling shutter distortion based on the correction amount;
       a residual correction amount calculation unit that calculates, for each frame, a residual correction amount, which is an amount of the rolling shutter distortion that is not corrected by the correction unit; and
       a recording unit that records the residual correction amount in association with an image for each frame of the moving image,
    wherein the associated residual correction amount is used for correcting an image of a selected frame from among the images of the frames, and a still image is generated from the corrected image of the selected frame.

11. An image generation apparatus that generates a still image from each frame image of a moving image recorded by an image processing apparatus that records a moving image used for generating a still image and comprises:
    at least one processor or at least one circuitry programmed to function as:
       a correction amount calculation unit that calculates, for each frame of the moving image, a correction amount for correction of a rolling shutter distortion of an image signal based on a shake amount of an image capturing apparatus;
       a correction unit that corrects, for each frame, the rolling shutter distortion based on the correction amount;
       a residual correction amount calculation unit that calculates, for each frame, a residual correction amount, which is an amount of the rolling shutter distortion that is not corrected by the correction unit;
       a recording unit that records the residual correction amount in association with an image for each frame of the moving image; and
       a generation unit that corrects an image of a selected frame from among the images of the frames based on the associated residual correction amount, and generates a still image.

12. An image processing method in which a moving image used for generating a still image is recorded, the method comprising:
    calculating, for each frame of the moving image, a correction amount for correction of a rolling shutter distortion of an image signal based on a shake amount of an image capturing apparatus;
    correcting, for each frame, the rolling shutter distortion based on the correction amount;
    calculating, for each frame, a residual correction amount, which is an amount of the rolling shutter distortion that is not corrected in the correction of the rolling shutter distortion based on the correction amount;
    recording the residual correction amount in association with an image for each frame of the moving image; and
    correcting an image of a selected frame from among the recorded images of the frames based on the associated residual correction amount, and generating a still image.

13. A non-transitory readable storage medium having stored thereon a program which is executable by an image processing apparatus, the program having a program code for realizing an image processing method in which a moving image used for generating a still image is recorded, the method comprising:
    calculating, for each frame of the moving image, a correction amount for correction of a rolling shutter distortion of an image signal based on a shake amount of an image capturing apparatus;
    correcting, for each frame, the rolling shutter distortion based on the correction amount;
    calculating, for each frame, a residual correction amount, which is an amount of the rolling shutter distortion that is not corrected in the correction of the rolling shutter distortion based on the correction amount;
    recording the residual correction amount in association with an image for each frame of the moving image; and
    correcting an image of a selected frame from among the recorded images of the frames based on the associated residual correction amount, and generating a still image.

* * * * *